Patented Mar. 11, 1947

2,417,294

UNITED STATES PATENT OFFICE 2,417,294

METHOD OF PREPARING MOLECULARLY ORIENTED COPOLYMERIZATES OF ACRYLONITRILE AND OTHER MONOETHYLENIC MONOMERS

Gaetano F. D'Alelio, Northampton, Mass., assignor to Pro-phy-lac-tic Brush Company, Northampton, Mass., a corporation of Delaware No Drawing. Application February 25, 1944, Serial No. 523,905

3 Claims. (Cl. 260—32)

The present invention relates to films, filaments and fibers fabricated from copolymerizates of acrylonitrile which articles are characterized by (1) having orientation of the polymer molecules parallel to the major axis and (2) having characteristic X-ray diffraction patterns. The particular object of this invention is to provide a method of preparing such fibers and filaments.

As is well known, polyacrylonitrile possesses characteristic properties in that it has a very high softening point and is extremely resistant to the solvent action of many bodies. Likewise, polyacrylonitrile is far too hard and brittle and too insoluble and possesses too high a softening point to be used in extruded or precipitated bodies for the fabrication of articles characterized by having orientation of the polymer molecules parallel to the major surface of the article.

In copending applications of mine, Serial Nos. 445,808, filed June 4, 1942; 449,678, filed July 3, 1943; 523,901, filed February 25, 1944; 523,902, filed February 25, 1944; 523,903, filed February 25, 1944; 523,904, filed February 25, 1944, it was shown that the properties of the polyacrylonitrile could be altered considerably even when small amounts of other monomers are used in the preparation of certain copolymers. In the above mentioned applications, it was also recognized that these copolymers were capable of being converted as, for example, by cold drawing, into products and structures wherein the molecules have been oriented so that they are parallel with the major surface and whereby the formed structures exhibit characteristic X-ray diffraction patterns. However, I have now discovered another method of accomplishing much the same results, the method being more advantageous with certain materials and under certain conditions.

By the term "a copolymerizate of acrylonitrile" is meant a copolymer of acrylonitrile with other polymerizable monoethylenic unsaturated monomers or materials wherein the acrylonitrile is substantially the major component of the copolymer. In general such copolymers possess at least 50 but not more than 85% acrylonitrile. The other copolymerizable ingredient or ingredients may be ethylenic unsaturated compounds, for example, the acrylates, methacrylates, itaconates, maleates, fumarates, vinyl ethers, vinyl aryls, etc., or mixtures of these. These monomers may be used alone or in conjunction with other monomers. These copolymers of acrylonitrile, when subjected to treatment of the type more fully described hereinafter, to form them into filaments, films, fibers, rods, tubes, and the like, exhibit, when cold drawn, a characteristic crystalline X-ray diffraction pattern in which the molecules are oriented parallel to the major axis. Articles so characterized have a very high degree of flexibility and ultimate tensile strength exceeding that of articles, such as films and filaments formed from the use of polymeric bodies in the usual manner.

It is common practice in the manufacture of sheets, filaments, and fibers to dissolve the polymer in a suitable solvent and cast or extrude a concentrated solution of the polymer to the desired form. This process requires a high degree of solubility in the polymer. This method is not readily applicable to all or many of the heteropolymers of acrylonitrile because many of the heteropolymers are only slightly soluble even in some of the more highly active polar solvents while others are completely insoluble even in these same active solvents. Of the copolymers which exhibit solubility it has been possible to prepare solutions up to approximately 10%. Such dilute solutions are not satisfactory from an industrial standpoint since they involve the use of large amounts of solvents and involve expensive recovery systems and include toxicity, fire and explosion hazards, if such solvents are inflammable or toxic.

Such dilute solutions of acrylonitrile copolymers are not altogether satisfactory in the preparation of the formed articles of this invention because large quantities of such highly active solvents as the nitrohydrocarbons must be used, and the removal of the major proportion of the solvent entails subjecting the copolymer to extended heat treatment wherein some loss of tensile strength, loss of form and high porosity in the finished filament or sheet may occur.

I have now discovered that it is possible to eliminate most of the difficulties of the solution method by utilizing gels of these copolymers. As is well known, a solution differs from a gel generally speaking, in that in solutions, the molecules of the solute (polymer) are dissolved substances dispersed among those of the solvent (nitrohydrocarbon) and are spatially movable whereas a gel is the apparently solid jelly-like material in which the molecules of the solute are spatially fixed and therefore is much more resistant to dimensional change when transferred from one container to another. A gel usually involves a reversal of the phase, that is, the solvent becomes the solute and the solute becomes the solvent. The difference between a solution and a gel is illustrated in the following:

A solution of 90 parts of nitromethane and 10 parts of the copolymer of acrylonitrile (70%) and vinyl ether (30%) is readily prepared by agitating the polymer in the nitrohydrocarbon. Within a period of a few hours, a liquid but viscous solution of the polymer in the solvent is obtained. If the nitromethane is removed from the solution as by evaporation, under heat or heat and vacuum, the viscosity is considerably increased and a solution which is much more viscous at room temperature is obtained. When the concentration of the polymer reaches about 18%, a mass is obtained which is a gel at room temperature but which may be easily reliquefied by heating above room temperature. Under vacuum and heat it is possible to concentrate solutions to obtain gels containing 25 to 30% or more of the polymer in the nitrocarbon. However, it is not necessary to first prepare a solution of the copolymer to obtain the gels used in the practice of this invention. The preferred method involved preparing the gel directly. These gels may be prepared by adding the desired amount of gelation solvent, for example, a nitrohydrocarbon, directly to the copolymer and forming the gel, by processing in suitable mixing equipment such as in a heated dough mixer, Banbury mixer, rubber or plastic milling rolls, etc.

In this way, it is possible to prepare gels of much higher concentration than by the solution method. Thus, it is possible to prepare a gel of 50 parts of gelation solvent and 50 parts of the copolymer of 70 parts of acrylonitrile and 30 parts of another monoethylenic unsaturated monomer, for example, vinyl butyl ether. At room temperature, such a gel is a tough cohesive rubbery jelly or dough-like mass, while at higher temperatures, it is an extremely viscous, flowable liquid which may be readily worked through orifices at relatively low pressures, of the order of 20 to 100 pounds per square inch.

In the practice of this invention, however, I prefer to use gels wherein the concentration of polymer is of the order of 25 to 30% of polymer. When heated to temperatures substantially above room temperature, that is, between 65° and 95° C., these gels may be readily filtered through candle filters to remove insoluble particles, ungelled particles, solid contaminants, etc.

Many advantages of this process result. Through its practice, it is possible to realize considerable economy in solvents, time, and equipment investment. Furthermore, the problems connected with the recovery of the gelation solvent are materially reduced. The method is particularly advantageous in the manufacture of fibers, monofils, and sheets. Considerable difficulty has been encountered in attempting to prepare fibers from solutions of acrylonitrile copolymers. Such solutions are extremely viscous and contain such a small amount of the polymer that a satisfactory filament is not formed when the material leaves the orifice of the extruding equipment. Furthermore, the small amount of polymer combined with the rapid evaporation of the solvent causes the article to be distorted, as it leaves the orifice. These difficulties are substantially eliminated when the gel is used instead of the solution. Once prepared and filtered, the gel is degassed at a temperature above room temperature and sufficient to liquefy the gel. The degassed gel is then ready for extrusion into fiber or sheet form. The degassed gel is stored in suitable containers at a temperature sufficient to keep the mass in a viscous plastic condition. It is transferred from these heated reservoirs to the spinnerets by constant pressure pumps. The spinnerets are likewise maintained at a temperature sufficient to keep the mass as a liquefied gel. As the gel leaves the orifices of the spinnerets, uniform filaments are readily formed and the spinning easily started so that the threads may be led through the drying chamber to winding rolls, etc., to be collected on bobbins. The filaments formed from this liquefied gel are uniform in size and free of distortion in contrast to those formed from solutions wherein little uniformity and much distortion occur. This is probably so because as the plastic mass leaves the spinneret, the filament is immediately converted to a rigid gel by the drop in temperature as it passes out of the spinneret. Possibly the change to a rigid gel is accelerated by loss of solvent as the material emerges from the orifice and the pressure to which it was subjected in passing through the orifice is released. The formed material is then subjected to drying at a temperature sufficient to remove a part of the gelation solvent so that the gel does not reliquefy even when heated to progressively higher temperatures.

On the other hand, when solutions are spun, temperatures higher than the spinneret temperatures must be used to remove the solvent. In the solution process, when the filament containing such a high quantity of solvent is subjected to higher temperatures, an immediate drop in viscosity occurs so that fibers lacking uniform dimensions are obtained, and considerable difficulty is encountered in initiating the spinning process and in keeping the spinning process operating continuously. Furthermore, in spinning from solutions, higher drying temperatures are required, with the result that the fibers tend to be porous and more brittle when compared with those prepared from the gelation process.

In the practice of my invention, the regelled polymer is dried in a suitable chamber to remove a greater part or substantially all of the solvent and then is subjected to a cold drawing operation. This cold drawing is accomplished by stretching the monofil. This is done preferably at room temperature or substantially above room temperature, but below the temperature of the melting point or decomposition point of the polymer. This cold drawing is accomplished in many of numerous ways, such as, by passing the monofil consecutively over differential rolls travelling at different speeds and the degree of cold drawing may be achieved by stretching of the order of 100 to 600% of the original length of the monofil. The temperature of the drawing may be room temperature or if the temperature desired is higher than room temperature, this may be accomplished by means of suitable liquid baths in which the polymer is insoluble. Liquid hydrocarbons, glycols, glycerine, diglycerine, are satisfactory liquid media to be used in effecting the cold drawing of these materials. Gaseous media likewise may be used. Air is satisfactory at lower temperatures. When higher temperatures are desired, inert gases, such as carbon dioxide, nitrogen, hydrogen, etc., are satisfactory.

The filament and sheet materials, as prepared by extrusion and drying is not molecularly oriented. It is only after the cold drawing process that it exhibits the characteristic X-ray diffraction pattern indicative of crystalline orientation. On the other hand, the increase in tensile strength and flexibility after the cold drawing is remarkable. As a rule, acrylonitrile copolymerizates have a tensile strength ranging in order from 5,000 to 10,000 pounds per square inch. When cold drawn to the extent of 200 to 500%, tensile strengths of the order of 15,000 to 40,000 or 50,000 pounds per square inch are readily obtainable.

In the practice of this invention, the nitrohydrocarbons were found to be the most suitable liquids for use in forming the gel. Since these solvents are used in intermediate stages in the practice of this invention, it is desirable that they have low boiling points so that they may be removed readily from the copolymer mass. Among suitable nitro-hydrocarbon solvents may be mentioned nitro-aliphatics, such as nitro-methane, nitroethane, nitropropane, nitrobutane, the nitro-aromatics and cyclo-aliphatics, etc. Also, there may be used in connection with them, but preferably in minor proportions, certain ketones, for instance, acetone, methyl ethyl ketone, methyl propyl ketone, methyl amyl ketone, acetophenone, phorone, methyl chlorphenyl ketone, methyl nitrophenyl ketone, chlorethyl nitrophenyl ketone, diacetone alcohol, acetonyl acetone, acetyl acetone, biacetyl, methyl acetoacetic ester, ethyl acetoacetic ester, etc.; the nitro-alcohols such as, 2-nitro-1-ethanol, 2-nitro-1-propanol, 2-nitro-1-butanol, 2-nitro-1-pentanol, etc.; esters of the aforementioned nitro-alcohols, such as, the formate, the acetate, the propionate, the butyrate, etc.; the ethers of the aforementioned nitro-alcohols, for example, the methyl, the ethyl, the propyl, and the butyl ethers, etc.; the cyano-alcohols, for example, lactonitrile, the addition products of the lower-boiling aldehydes, and ketones with hydrogen cyanide, for example, the reaction products of hydrogen cyanide with acetaldehyde, propionaldehyde, acetone, methyl ethyl ketone, etc.; the esters of the cyano-alcohols, for example, the formate, the acetate, the propionate, etc.; the ethers of the cyano-alcohols, for example, the methyl, ethyl, propyl. etc., ethers. Certain phosphates such as trimethyl and triethyl phosphates may likewise be used.

For certain compositions, if it is desirable, such gelation solvents as pyridine, quinoline, acetic anhydride, acetic acid, etc., may be used, but they are undesirable from a health and safety factor or from the corrosion factor encountered in the manufacturing process. The foregoing gelation agents are mentioned by way of illustration and not as limitations, except as limitations are found in the claims appended hereto, since I believe myself to be the first to discover the possibility of making a gel from the materials in question and the process of utilizing the gel. Likewise, it may be desirable to introduce a certain amount of plasticizing material in these copolymers and it is desirable that such plasticizer compounds be introduced into the polymer mass after the gelation of the mass has been accomplished by the gelation solvents.

Since it is difficult to incorporate plasticizers into the copolymers of this invention by the ordinary milling process, I prefer to accomplish this by adding the plasticizer either to a solution or to a gel of the copolymer in the solvents mentioned heretofore. By this method many plasticizers which normally do not possess good compatibility with the polymer may be incorporated into the polymer. Suitable high-boiling plasticizers may be mentioned, the polybasic esters of cyano-alcohol and of the nitro-alcohols, such as, the esters of phthalic, succinic, sebacic, tetrahydrophthalic, endomethylene tetrahydrophthalic, acetyl citric acids, etc. It is not necessary that all of the carboxyl groups of the polybasic acid be esterified with the cyano alcohol or the nitro-alcohol. Thus, in a dicarboxylic acid, one carboxyl group may be esterified with the cyano alcohol and the other with the methyl, ethyl, propyl, butyl alcohols, etc.; and in a tricarboxylic acid, it is sufficient if one or two of the carboxyl groups are esterified with another alcohol. Also, as suitable plasticizers for the products of this invention may be mentioned the condensation products of acrylonitrile with organic compounds containing the active hydrogen much as, for example, the condensation product of an acrylonitrile and acetone wherein the hydrogens of the —CH$_3$ groups of the acetone may be substituted by from one to six p-cyanoethyl groupings. Other plasticizers which may be prepared by the condensation of acrylonitrile with organic compounds containing active hydrogen are the condensation products with alcohols, for example, with phenyl ethyl alcohol, phenoxyethyl alcohol, methoxydiethylene glycol, ethoxydiethylene glycol, phenoxydiethylene glycol, etc., condensation products of acrylonitrile with such compounds as the acetoacetic esters, malonic esters, acetyl acetone, and certain polycyclic hydrocarbons containing active

groupings, the condensation products of acrylonitrile with cyano and nitro alcohols, etc.

The fibers and smaller articles produced according to this invention may be woven into highly insoluble and chemically resistant cloth for use in filter cloths and handling chemicals and the like. They may also be used for textiles, for example, cloth, hosiery, articles of clothing, etc. In the form of sheets, they may be used as protective coatings, awnings, rain coats, shower curtains, aprons, hospital bed sheeting, containers for hydrocarbon oils, gasoline, kerosene, vasoline, ointments, etc.

The following example illustrates how this invention may be carried into effect:

| | Parts |
|---|---|
| Distilled water | 400 |
| Polyvinyl alcohol | 2 |
| Benzoyl peroxide | 1 |
| Monomer mixture | 100 |

As examples of typical monomer mixtures which may be used in the above formulation I may use.

| | Parts | Parts | Parts | Parts | Parts | Parts | Parts | Parts |
|---|---|---|---|---|---|---|---|---|
| Acrylonitrile | 75 | 73 | 70 | 65 | 65 | 70 | 65 | 60 |
| An acrylic ester | 25 | | 25 | 25 | | | 20 | 35 |
| A vinyl ether | | 27 | | 10 | 25 | 20 | | |
| A maleic ester | | | 5 | | 10 | | | 5 |
| Styrene | | | | | | | 10 | 15 | |

The polyvinyl alcohol is dissolved in the water prior to the addition of the remaining ingredients. The mixture is then heated under agitation at 50 to 60° C., until the polymerization is completed. The granular material is in the form of spheres which are filtered off, washed with distilled water and dried in a vacuum oven at 50° C. The copolymers of the above compositions are mixed with sufficient gelation solvent, e. g., nitromethane or ethane in the ratio of 20 to 30 parts of polymer to 70 to 80 parts of gelation solvent. The mixture of polymer and gelation solvent is processed in a dough mixer at 85 to 95° C., until a homogeneous mass which is a liquefied gel is obtained. At these temperatures the mass is a liquid but when allowed to cool to room temperature, it solidifies to a rubbery jelly-like mass, i. e., to a gel. The liquefied gel is passed through candle filters to remove all insoluble, ungelled, and foreign particles. The filtered liquefied gel is then transferred to reservoirs in which it is degassed under vacuum while still in a liquid state. From these reservoirs the liquefied gel is pumped through orifices to give the material the desired shape, that is, through spinnerets for the preparation of fibers or monofils, or, through a die in the form of a slit for the preparation of sheets. As the formed plastic mass leaves the orifice, it resets to a gel by passing through an area whose temperature is lower than the temperature at which the orifice is maintained. The extruded material is then subjected to a drying process. The drying is accomplished at a temperature sufficient to remove a quantity of the gelation solvent so that the gel does not reliquefy even when heated to progressively higher temperatures. For example, in spinning a fiber, the spinneret temperature may be maintained about at 80° C. On leaving the spinneret, the temperature of the monofil may be dropped to room temperature or even up to 35° C. for a distance of a few inches before entering a drying chamber. During this short interval the material changes to a gel. The immediate area of the drying chamber into which the filament passes may be maintained at approximately 50° C. On reaching this area, sufficient surface evaporation and drying of the monofil occurs to form a rigid shell around the remaining gel mass, thereby giving it added strength. The drying of the filament may be continued at this same temperature in a relatively long drying chamber. If a shorter chamber is used, the filament can be passed directly into a region of higher temperature without liquefying the gel because of the partially dried shell existing around the interior gel. The completely dried or partially dried monofil is led from the drying chamber to the cold drawing mechanism which consists of at least two differential rolls whose speeds are adjusted so that any degree of cold drawing up to the elastic limit of the drawn monofil can be attained. Usually the extent of cold drawing lies within the limits of 100 to 600%.

In the practice of the cold drawing of this invention, I prefer to work in a range of 200 to 500%. Preferably, cold drawing temperatures between 25 and 75° C. are preferred. After the cold drawing, the filaments may be subjected to a twisting operation and collected on bobbins. The filament, as prepared by extrusion of the gel, and drying is not molecularly oriented.

I claim:

1. A cohesive workable reversible gel adapted to the preparation of shaped or molecularly oriented structures which consists of a liquid nitrohydrocarbon and the co-polymerization product of a mixture comprising at least 55 percent but not more than 85% of acrylonitrile and another polymerizable monomer containing a single olefinic double bond, the copolymerization product forming from 20 to 50 percent of the gel.

2. A cohesive workable reversible gel adapted to the preparation of shaped or molecularly oriented structures which consists of nitromethane and the co-polymerization product of a mixture comprising at least 55 percent but not more than 85% of acrylonitrile and another polymerizable monomer containing a single olefinic double bond, the copolymerization product forming from 20 to 50 percent of the gel.

3. A cohesive workable reversible gel adapted to the preparation of shaped or molecularly oriented structures which consists of nitroethane and the copolymerization product of the mixture comprising at least 55 percent but not more than 85 percent of acrylonitrile and another copolymerizable monomer containing a single olefinic double bond, the copolymerization product forming from 20 to 50 percent of the gel.

GAETANO F. D'ALELIO.

REFERENCES CITED

The following references are of record in the file of this patent:

UNITED STATES PATENTS

| Number | Name | Date |
|---|---|---|
| 2,140,048 | Fickentscher et al. | Dec. 13, 1938 |
| 2,238,730 | Hauffe | Apr. 15, 1941 |
| 1,929,453 | Semon | Oct. 10, 1943 |
| 2,367,493 | Fordyce et al. | Jan. 16, 1945 |

FOREIGN PATENTS

| Number | Country | Date |
|---|---|---|
| 519,788 | British | Apr. 5, 1940 |
| 387,976 | British | Feb. 16, 1943 |

OTHER REFERENCES

Bogin et al., (1) article in Ind. Eng. Chem., pages 1091–1096, Sept., 1942. Bogin (2) "How the Coating Industry is Using the Nitroparaffins" (20 pp.) reprinted from Paint, Oil, and Chemical Review, issues of Aug. 27, Sept. 10 and 24, and Oct. 1942. (Copy in Div. 56.)

Lewis et al.; "Industrial Chemistry of Colloidal and Amorphous Materials," page 225, published by Macmillan Co., N. Y. 1943. (Copy in Div. 50.)